United States Patent [19]
Peckham, Jr.

[11] 3,929,209
[45] Dec. 30, 1975

[54] BICYCLE POWER BRAKE

[76] Inventor: Victor A. Peckham, Jr., 1151 Fifth St., Manhattan Beach, Calif. 90266

[22] Filed: Mar. 5, 1975

[21] Appl. No.: 555,414

Related U.S. Application Data

[62] Division of Ser. No. 450,886, March 13, 1974, Pat. No. 3,882,971.

[52] U.S. Cl................ 188/24; 188/72.7; 188/140 R
[51] Int. Cl.² .......................................... B62L 1/12
[58] Field of Search ........... 188/24, 2 D, 71.2, 72.7, 188/140 R, 140 A

[56] References Cited
UNITED STATES PATENTS

| | | | |
|---|---|---|---|
| 3,833,096 | 9/1974 | Norman | 188/72.7 |
| 3,842,946 | 10/1974 | Blevens | 188/24 |

FOREIGN PATENTS OR APPLICATIONS

| | | | |
|---|---|---|---|
| 442,384 | 11/1948 | Italy | 188/24 |
| 924,490 | 8/1947 | France | 188/24 |
| 1,072,013 | 9/1954 | France | 188/24 |

*Primary Examiner*—Trygve M. Blix
*Assistant Examiner*—Edward R. Kazenske
*Attorney, Agent, or Firm*—Brown, Murray, Flick & Peckham

[57] ABSTRACT

A caliper brake is mounted on a fork of a bicycle and straddles the peripheral portion of the wheel that is mounted in the fork. In front of the brake a clamp straddles the peripheral portion of the wheel, but is supported by a device that is movable forward and backward relative to the bicycle frame. The clamp normally is disengaged from the wheel. A manually operable device is connected with the clamp for clamping it against the rotating wheel so that the movable supporting device will be moved forward by the wheel. When this occurs, an actuating device operable connecting the supporting device with the brake applies the brake to the wheel with considerable force.

9 Claims, 3 Drawing Figures

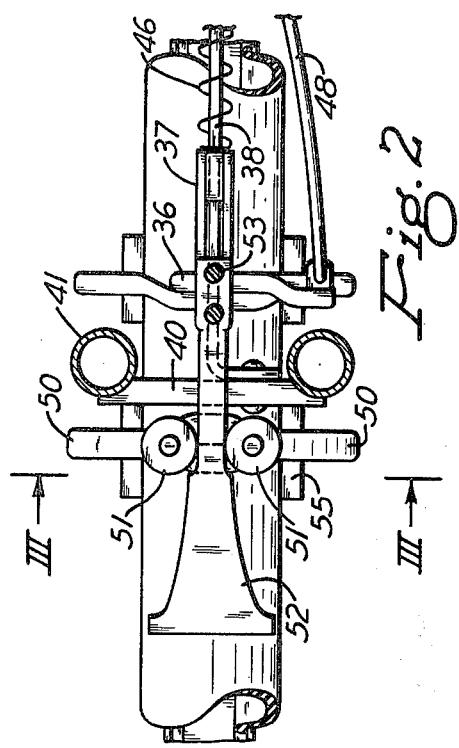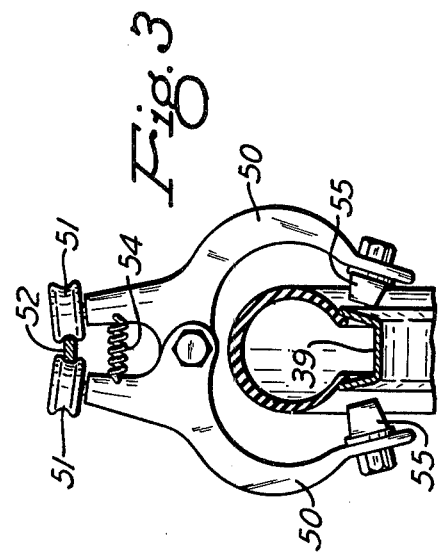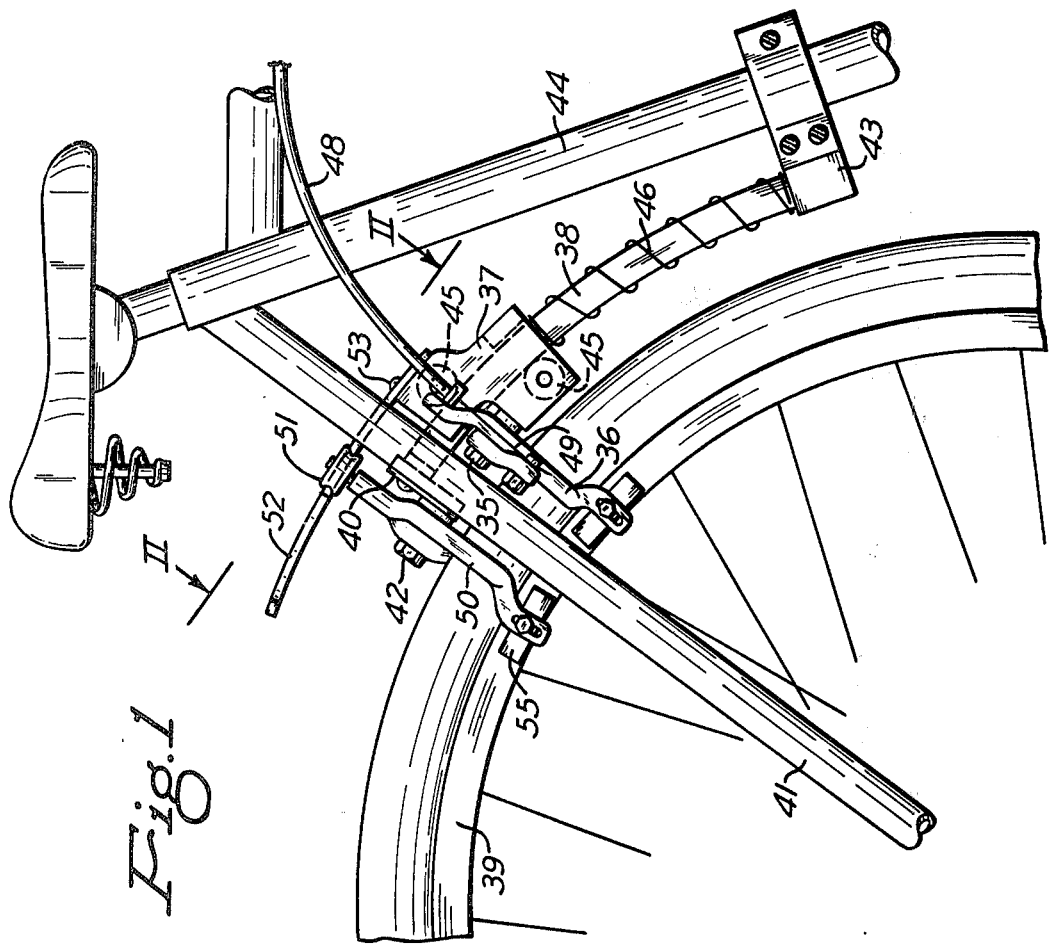

BICYCLE POWER BRAKE

This application is a division of my copending patent application Ser. No. 450,886, filed Mar. 13, 1974, now Pat. No. 3,882,971.

There are two principal types of bicycle brakes. One, the coaster brake, is housed in the hub of the rear wheel of a bicycle and is operated by pressing downwardly on the bicycle pedal that at that time happens to be located behind the axis of the sprocket to which the pedals are connected. The other type of brake is the caliper brake, which includes a pair of levers that are pivotally connected together above the rear tire and straddle that tire and the rim. The lower ends of the levers are provided with rubber blocks for frictionally engaging the opposite sides of the rim when the upper ends of the levers are squeezed together by a flexible wire that is pulled when the bicycle rider squeezes an operating lever attached to the handle bars. A similar caliper brake, operated by a second hand lever, often is associated with the front wheel of the bicycle, in which case both hand levers generally are squeezed at the same time. Caliper brakes are effective when sufficient pressure is applied to the hand levers to cause the brakes to tightly grip the rims of the wheels, but with some people, especially children, enough pressure may not or possibly cannot be applied to prevent the wheels from sliding across the brake blocks when a quick stop is desired. A large share of the problem is due to deflections, stretch, clearances and brake block compression in the brake rigging, all of which occur in practice and increase the work i.e. force times distance, necessary for applying the brakes.

It is among the objects of this invention to provide a bicycle brake of the caliper type which requires very little pressure on the operating lever to apply the brake tightly to a wheel, which is relatively simple in construction, and which uses the inertia of the bicycle as power to apply the brake.

The invention is illustrated in the accompanying drawings, in which

FIG. 1 is a fragmentary side view of a bicycle provided with my brake;

FIG. 2 is an enlarged horizontal section taken on the line II—II of FIG. 1; and

FIG. 3 is an enlarged cross section taken on the line III—III of FIG. 2.

Referring to FIGS. 1, 2 and 3 of the drawings, a bicycle of conventional construction has a frame 44 provided with the usual rear fork 41, in the lower end of which the axle of the rear wheel 39 is mounted. The wheel includes a rim encircled by a pneumatic tire, and is driven by the usual chain and sprockets (not shown).

A short distance above the rear tire the sides of the rear fork are connected by a cross piece 40 welded or clamped to them. Secured to this cross piece is the upper end of a curved bar 38 that is concentric with the wheel and that extends forward and down into a bracket 43 secured to the bicycle frame. The bar extends through a passage through a small carriage 37, which is provided with rollers 45 engaging the front and rear surfaces of the bar so that it can travel along the bar. The carriage normally is held in its upper position by means of a coil spring 46 encircling the bar between the lower end of the carriage and the bracket 43 below it.

Projecting from the lower part of the rear end of the carriage is a pivot member 35, on which the two levers of a clamp 36 are pivotally mounted. The clamp can be in the form of a conventional caliper brake, although its primary function is not that of a brake but of a clutch for engaging the back wheel to provide means for transmitting power from the rotating wheel to a brake behind this clamp. The lower ends of the two clamp levers are provided with friction blocks of rubber or the like for engaging the opposite sides of the rim of the wheel, from which they normally are spaced by a torsion spring (not shown) that urges the lower ends of the levers apart. The upper ends of these levers project from the same side of pivot member 35, but one is above the other in such relation that when they are moved toward each other, the friction blocks likewise are moved toward each other. A flexible tube 48 is rigidly connected to the outer end of the upper lever and extends forward in the usual manner along the top of the bicycle frame and up to a bracket (not shown) that is rigidly mounted on the handlebars in the usual way in front of one of the hand grips, where it pivotally supports a conventional hand lever. The front end of tube 48 is rigidly connected to the bracket in a well-known manner. Extending through the tube is a strong flexible wire 49 (FIG. 1), the front end of which is secured to the front end of the hand lever. The rear end of the wire extends out of the tube and down to the upper end of the lower clamp lever, to which it is rigidly connected.

Projecting from the back of cross piece 40 is a pivot member 42, on which the levers 50 of a caliper brake are pivotally mounted. The lower ends of these levers carry brake blocks 55 for engaging the opposite sides of the wheel rim. The upper ends of the brake levers 50 extend upwardly and support grooved rollers 51 at their upper ends, which engage the opposite sides of a cam bar 52, the front end of which is attached by screws 53 to the top of carriage 37. The two rollers are pressed against the cam bar by means of a coil spring 54 connecting the upper ends of the levers as shown in FIG. 3.

While the brake blocks are spaced from the wheel rim, the rollers engage a narrow portion of the cam bar that is of uniform width as shown in FIG. 2. However, when the hand lever on the handlebars is squeezed upwardly toward the hand grip above it, it pulls wire 49 forward in tube 48 and this causes the pivoted clamp 36 to grip the rear wheel in the way that a caliper brake does, which immediately moves the clamp and carriage 37 down bar 38. The moving carriage pulls cam bar 52 forward so that the rearwardly diverging portion of the bar shown in FIG. 2 enters between rollers 51 and wedges them apart to apply the brake to the wheel and stop its rotation. When the hand lever is released, the clamp is released from the wheel so that spring 46 can return the clamp and carriage to their uppermost position, thereby moving cam bar 52 backward to release the brake.

A moderate amount of pressure applied to the hand lever is sufficient to apply the clamp to the wheel. The pressure then exerted by cam 52 spreads the upper ends of the brake levers 50 with a great deal of force to apply the brake. The inertia of the moving bicycle therefore is used as the power for applying the brake, and the higher the speed of the bicycle the more quickly and firmly the brake will engage the wheel.

In a conventional caliper braking system on a bicycle, one must trade off the leverage available by a given movement of the hand lever against the travel of the lever. High leverage equals high cable force multiplied by short cable travel, while low leverage equals low cable force multiplied by long cable movement. In both cases, when cable force is multiplied by cable travel, there is insufficient work to do the job of applying the brakes fully. In my invention, on the other hand, the relatively light force of the clamp gripping the wheel rim is transformed through cam 52 into a greater force, whereby sufficient work is produced to accomplish the desired result of applying the brake.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In a bicycle having a frame with a fork supported by a wheel rotatably mounted therein, a caliper brake mounted on said fork and straddling the peripheral portion of the wheel, a clamp straddling the peripheral portion of the wheel and normally disengaged from it, a bar extending part way around said wheel and rigidly attached to the frame, a carriage mounted on the bar for movement along it, means connecting said clamp to the carriage, manually operable means connected with the clamp for clamping it against the rotating wheel so that said carriage will be moved forward by the wheel, and a cam bar connected to said carriage and extending toward the brake, the brake having pivoted levers straddling the cam bar, and the cam bar being shaped to spread said levers farther apart to apply the brake to the wheel when the cam bar is moved forward by said carriage.

2. In a bicycle according to claim 1, said clamp being a caliper type clamp that includes actuating levers movable toward each other to apply the clamp to the wheel, and said manually operable means including a hand lever pivotally supported by a bracket on the handlebars, a flexible tube secured at its ends to said bracket and one of the clamp levers, and a flexible wire extending through said tube and secured at its ends to said hand lever and the other clamp lever.

3. In a bicycle according to claim 1, rollers carried by said brake levers in engagement with said cam bar.

4. In a bicycle according to claim 1, said brake being behind said fork, and said carriage and bar being in front of the fork.

5. In a bicycle according to claim 1, said carriage having a passage therethrough for said bar.

6. In a bicycle according to claim 5, said carriage including wheels running on the bar.

7. In a bicycle according to claim 1, a spring for moving said carriage rearwardly when said clamp is released from the wheel.

8. In a bicycle according to claim 7, said spring being a coil spring encircling said bar in front of the carriage.

9. In a bicycle according to claim 4, said carriage having a passage therethrough for said bar, and a coil spring encircling said bar between the carriage and the front end of the bar for moving the carriage back toward said fork when said clamp is released from the wheel.

* * * * *